Nov. 10, 1925.
A. A. WOOLMAN
1,561,134
FOLDING SOLDERING IRON
Filed Oct. 7, 1924
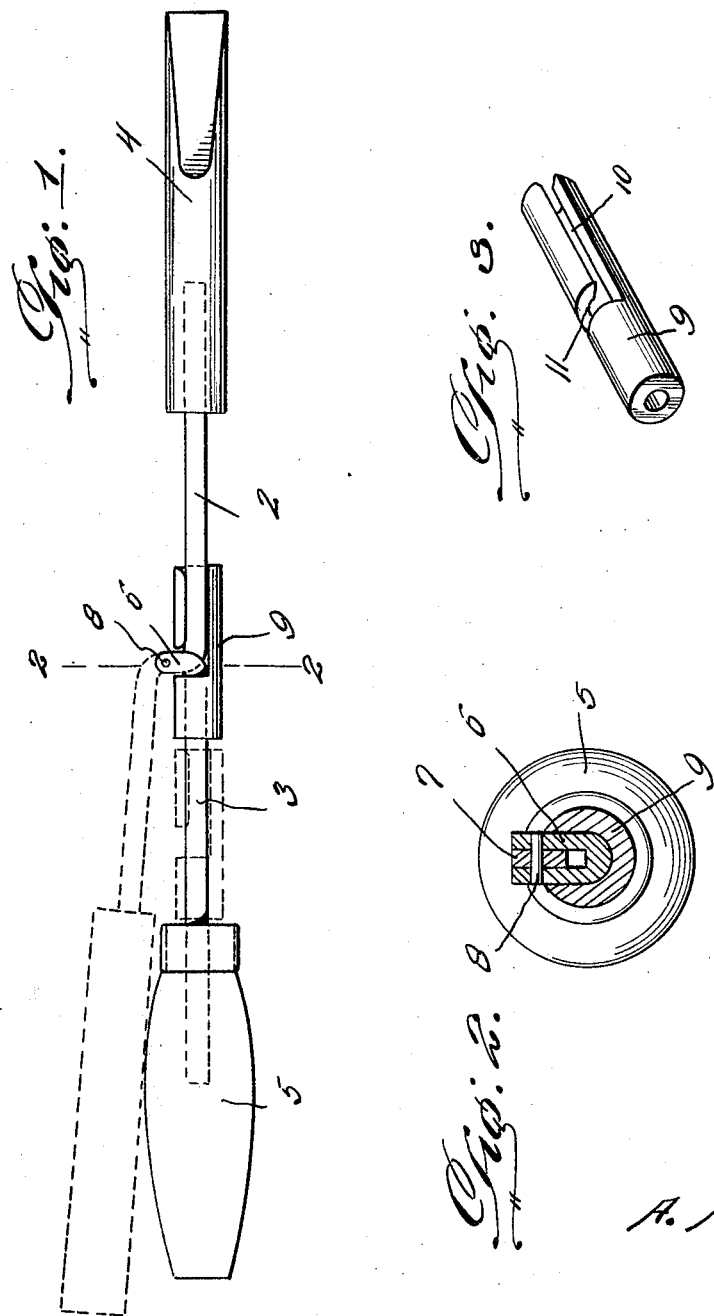

Patented Nov. 10, 1925.

1,561,134

UNITED STATES PATENT OFFICE.

ARTHUR A. WOOLMAN, OF DEER LODGE, MONTANA.

FOLDING SOLDERING IRON.

Application filed October 7, 1924. Serial No. 742,169.

*To all whom it may concern:*

Be it known that I, ARTHUR A. WOOLMAN, a citizen of the United States, residing at Deer Lodge, in the county of Powell and State of Montana, have invented certain new and useful Improvements in Folding Soldering Irons, of which the following is a specification.

This invention relates to a soldering iron, which is adapted to be folded when not in use, thereby occupying a minimum amount of space when stored away.

Another important object of the invention is to provide a folding soldering iron of the above mentioned character, which may be readily and easily reassembled for use, means being provided for preventing the accidental collapsing or removing of the tool when in use.

A further object of the invention is to provide a folding soldering iron of the above mentioned character, which is simple in construction, inexpensive, strong and durable, and further well adapted for the purposes for which it is designated.

Other objects and advantages of this invention will become apparent during the course of the following description.

In the accompanying drawing, forming a part of this specification, and in which like numerals designate like parts throughout the same:

Figure 1 is a side elevation of the folding soldering iron embodying my invention;

Fig. 2 is a sectional view, taken approximately on the line 2—2 of Fig. 1; and

Fig. 3 is a detail perspective view of the locking sleeve.

In the drawing, wherein for the purpose of illustration is shown the preferred embodiment of my invention, the numeral 1 designates generally the soldering iron, the same comprising the shank portion which includes the hinged sections 2 and 3 respectively, the soldering head 4 being secured on the outer end of the section 2, while the handle 5 of the soldering iron is secured on the outer end of the section 3. The inner end of the section 3 terminates in the upwardly disposed substantially U-shaped bracket 6, in which is received the upwardly disposed inner end 7 of the section 2, a transverse pin 8 extending through the bracket 8 and the upwardly disposed end 7 of the section 2 for hingedly connecting the sections of the shank together. This construction enables the soldering head 4 to be swung rearwardly into the position shown in the dotted lines in Fig. 1, when the soldering iron is not in use.

For the purpose of holding the hinged sections of the shank in an extended position, the locking sleeve 9 is provided, the same being adapted for slidable movement on the section 3 of the shank. The locking sleeve 9 is provided with a longitudinally extending slot 10, which extends from the forward end thereof and terminates at its inner end in the laterally extending slot 11, in the manner as clearly illustrated in Fig. 3. A purpose of this construction is to provide a means whereby the longitudinal movement of the sleeve on the shank of the soldering iron is prevented, when the sleeve is in the position as shown in Fig. 1. When in this position, the upwardly extending inner ends of the sections will be disposed in the lateral slots 11, and the sleeve cannot move in either direction. By rotating the sleeve slightly in one direction, the upwardly extending inner ends of the hinged sections will be in registry with the longitudinal slot 10, and by moving the sleeve 9 rearwardly to the position as shown in the dotted lines on the section 3, the sleeve will be disengaged from the hinged portions of the sections, and permit the section 2, with the soldering head on the forward end thereof to be swung rearwardly into the position as shown in the dotted lines.

It will thus be seen from the foregoing description that a soldering iron has been provided, which may be readily and easily folded, when not in use, and further assembled when ever it is desired to use the same, the locking sleeve holding the hinged sections of the shank in their extended positions against accidental holding.

While I have shown the preferred embodiment of my invention, it is to be understood that various changes in the size, shape and arrangement of parts may be resorted to, without departing from the spirit of the invention and the scope of the appended claim.

Having thus described my invention, what I claim is:

A soldering iron including a shank formed in two elongated sections having their inner ends provided with lateral extensions, means for pivoting the terminals of the lateral extensions together, a soldering head on the end of one section, a handle on the end of the other section, and a sleeve slidable and rotatable on the section having the handle and provided with a bayonet slot for receiving the lateral extensions when the sections are in alinement so that a portion of the sleeve is extended over the section having the soldering head thereon thereby holding the two sections extended in alinement with each other.

In testimony whereof I affix my signature.

ARTHUR A. WOOLMAN.